United States Patent
Aly et al.

(10) Patent No.: US 9,130,502 B1
(45) Date of Patent: Sep. 8, 2015

(54) PHOTOVOLTAIC PANEL CLEANING MACHINE

(71) Applicant: KING FAHD UNIVERSITY OF PETROLEUM AND MINERALS, Dhahran (SA)

(72) Inventors: Shahzada Pamir Aly, Abbottabad (PK); Palanichamy Gandhidasan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/571,111

(22) Filed: Dec. 15, 2014

(51) Int. Cl.
*H02S 40/10* (2014.01)
*B08B 11/04* (2006.01)
*F24J 2/46* (2006.01)

(52) U.S. Cl.
CPC ............ *H02S 40/10* (2014.12); *B08B 11/04* (2013.01); *F24J 2/461* (2013.01)

(58) Field of Classification Search
CPC .......... B08B 11/02; B08B 11/04; F24J 2/461; H02S 40/10
See application file for complete search history.

(56) References Cited

U.S. PATENT DOCUMENTS

| | | | |
|---|---|---|---|
| 8,863,349 B2 * | 10/2014 | Alsadah | ................. 15/246 |
| 2007/0240278 A1 | 10/2007 | MacDonald | |
| 2012/0304405 A1 | 12/2012 | Knopow et al. | |
| 2013/0037051 A1 | 2/2013 | Eitelhuber | |

FOREIGN PATENT DOCUMENTS

| | | | |
|---|---|---|---|
| DE | 102010025845 | | 1/2011 |
| DE | 10 201 0 006 531 A1 * | | 8/2011 |
| JP | 2004-186632 | * | 7/2004 |
| KR | 101328471 | | 11/2013 |

* cited by examiner

*Primary Examiner* — Randall Chin
(74) *Attorney, Agent, or Firm* — Richard C Litman

(57) ABSTRACT

The photovoltaic panel cleaning machine is installed upon a linear array of photovoltaic (solar) panels, automatically operating periodically to remove any dust, debris, and/or light condensation from the panels to optimize their efficiency. The machine is driven back and forth along tracks extending along opposite edges of the panel array, and receives electrical power from a storage battery charged by the solar panel array. The machine includes an air compressor, a blower and nozzles that blow dust and debris from the solar panels, and two different roller brushes. Air is blown over the panels on the first pass, and the machine then reverses direction to apply a first roller to the panels for further debris removal on a second pass. A third pass is made using the air blower, and the direction reverses once again, the second roller being applied on the fourth pass to statically attract any remaining debris.

18 Claims, 6 Drawing Sheets

PHOTOVOLTAIC PANEL CLEANING MACHINE

BACKGROUND OF THE INVENTION

1. Field of the Invention

The present invention relates generally to photovoltaic or solar panels, and particularly to an automated photovoltaic panel cleaning machine for periodically removing dry dust, debris, and/or moisture condensation from photovoltaic (solar) panel arrays.

2. Description of the Related Art

The harvesting or gathering of solar energy by means of photovoltaic (pv) panels, also known as solar panels, has become increasingly popular in response to the depletion of petroleum resources and their corresponding costs, as well as the desire to reduce atmospheric and other forms of pollution. While solar panels are still relatively costly, the cost of production of such panels has been decreasing and the efficiency of such panels has been increasing with advances in technology. This has resulted in the cost-effective installation of solar panels in many areas of the world, particularly in relatively dry and cloudless regions near the equator where maximum solar energy may be received by such panels.

One perennial problem with such solar panel installations is that such dry areas are subject to a relatively large amount of wind-blown dust, sand, and other debris. This can result in the relatively rapid deposition of a thin layer of relatively opaque material covering the energy receiving surfaces of a solar panel array. It has been found that the energy gathering efficiency of photovoltaic (pv, or solar) panels can be degraded on the order of fifty percent in a relatively short span of time by wind-blown dust and debris, depending upon the strength and direction of the wind and the nature of the soil and ground cover upwind of the solar panel array. Strong winds can create dust storms and sandstorms that may carry dust and sand a considerable distance, perhaps up to a hundred miles or more, to cover exposed articles (such as solar panels) with debris.

Another concern is the accumulation of condensation particles (i.e., dew and frost) on solar panels as the temperature reaches the dew point at night, even in drier climates. While frost will generally melt soon after sunrise at lower elevations and latitudes before the sun reaches an angular elevation sufficient for efficient energy production, there may still be some liquid moisture remaining on the solar panels until the air warms sufficiently to evaporate the moisture, particularly if there is little difference between the ambient temperature and the dewpoint. It is desired that any moisture be removed from the solar panels some time before the sun reaches an elevation sufficient to efficiently produce electrical power, in order to optimize the reception of sunlight by the panels.

Thus, a photovoltaic panel cleaning machine solving the aforementioned problems is desired.

SUMMARY OF THE INVENTION

The photovoltaic panel cleaning machine provides for the automated cleaning of photovoltaic (PV, or solar) panels using both pneumatic blowing and mechanical brushing or scrubbing to remove accumulated dust, sand, and/or other debris from the panels. The machine incorporates a small air compressor to supply the required air. The air is dispensed from nozzles along a tube that extends across the solar panels. A photocell senses when there is adequate sunlight to warrant operation of the solar panels, i.e., to determine their need for cleanliness. When the photocell senses sufficient sunlight, a timer is actuated to delay the start of the cleaning operation to an optimum time. A hygrometer detects latent humidity to determine whether conditions are correct for operation of the device, i.e., there is no appreciable moisture disposed upon the solar panels. Alternatively, the operating system of the machine may be programmed to blow dry some slight accumulation of moisture on the panels. The machine is advanced along the length of the elongate solar panel array by a plurality of motorized wheels traveling in tracks or rails installed along each edge of the solar panel array.

When the panels have been determined to be dry, the machine rotates the pneumatic blower tube away from the panel surface while simultaneously rotating a foam plastic roller in contact with the panel. The roller is motorized so that the roller surface advances in the direction of travel of the machine along the solar panels, i.e., there is relative motion between the contact surface of the roller and the panels during operation as the apparatus reverses direction and travels back along the length of the solar panel array. This removes most, if not all, solid particles remaining after the air blowing operation.

The foam plastic roller is then rotated away from the surface of the panels, and the pneumatic blower tube is simultaneously rotated once again adjacent to the panel surface. The direction of travel is reversed once again, with the machine proceeding along the length of the panel array in its original direction of travel while blowing any remaining material from the panel surface.

Finally, the roller and blower assembly is rotated to position a second roller in contact with the surface of the solar panel array. This second roller incorporates a synthetic fiber material that generates a static electrical charge as it brushes against the surface of the panels. This static charge attracts any remaining dust and/or particulate debris from the panel surface as the machine reverses its direction once again to return to its original starting position at one end of the panel array.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The photovoltaic panel cleaning machine provides for the automatic cleaning of a linear array of photovoltaic (PV, or solar) panels without the use of water or other liquids, thus obviating the need to provide a supply of such liquids. This is particularly valuable in dry environments where such PV or solar panels are often deployed in order to maximize their exposure to sunlight.

Figure 1:
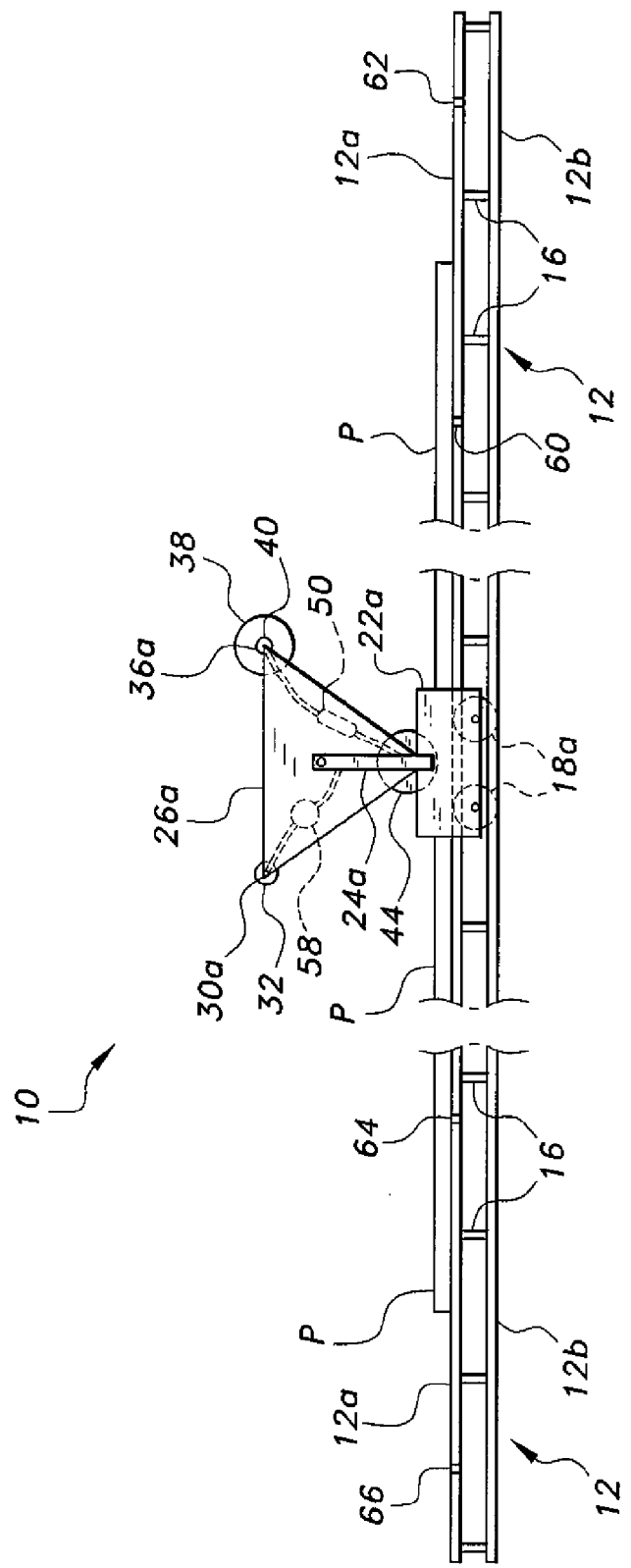
FIG. 1 is an environmental side elevation view of a photovoltaic panel cleaning machine according to the present invention, as installed upon an array of photovoltaic panels.
Figure 2:
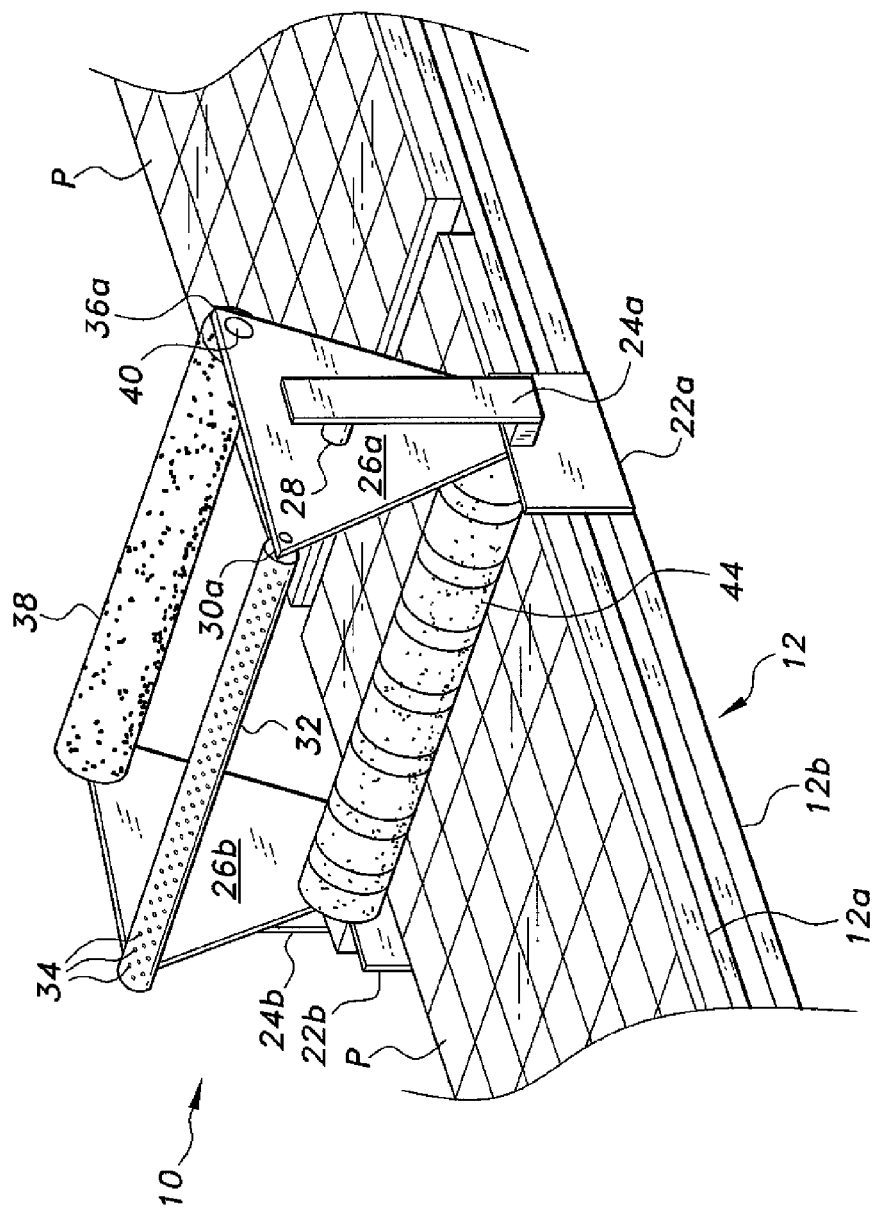
FIG. 2 is a detailed environmental perspective view of the photovoltaic panel cleaning machine according to the present invention, illustrating further features thereof.

FIG. 1 of the drawings is an environmental side elevation view of a linear array of PV or solar panels P, showing the panel cleaning machine 10 movably installed thereon. The solar panel array P includes laterally opposed first and second tracks 12 and 14, respectively. One of the tracks 1, 14 is disposed along each of the opposite lateral edges of the panel array P. The tracks 12 and 14 extend somewhat beyond the opposite ends of the PV panel array P as shown in FIG. 1, so the machine 10 does not shade the PV panels when the machine 10 is parked and/or reverses its direction of travel after each pass over the panels P. Each track 12, 14 comprises an upper rail and a lower rail spaced apart from the upper rail. Track 12 has upper and lower rails 12a and 12b, and track 14 has upper and lower rails 14a and 14b. Each of the rails 12a, 12b, 14a, and 14b comprises a generally U-shaped section, the upper rails 12a, 14a being inverted. The two rails 12a, 12b and the two rails 14a, 14b are spaced apart from one another by substantially vertical ties 16. This configuration is shown most clearly in FIG. 4 of the drawings.

Figure 4:
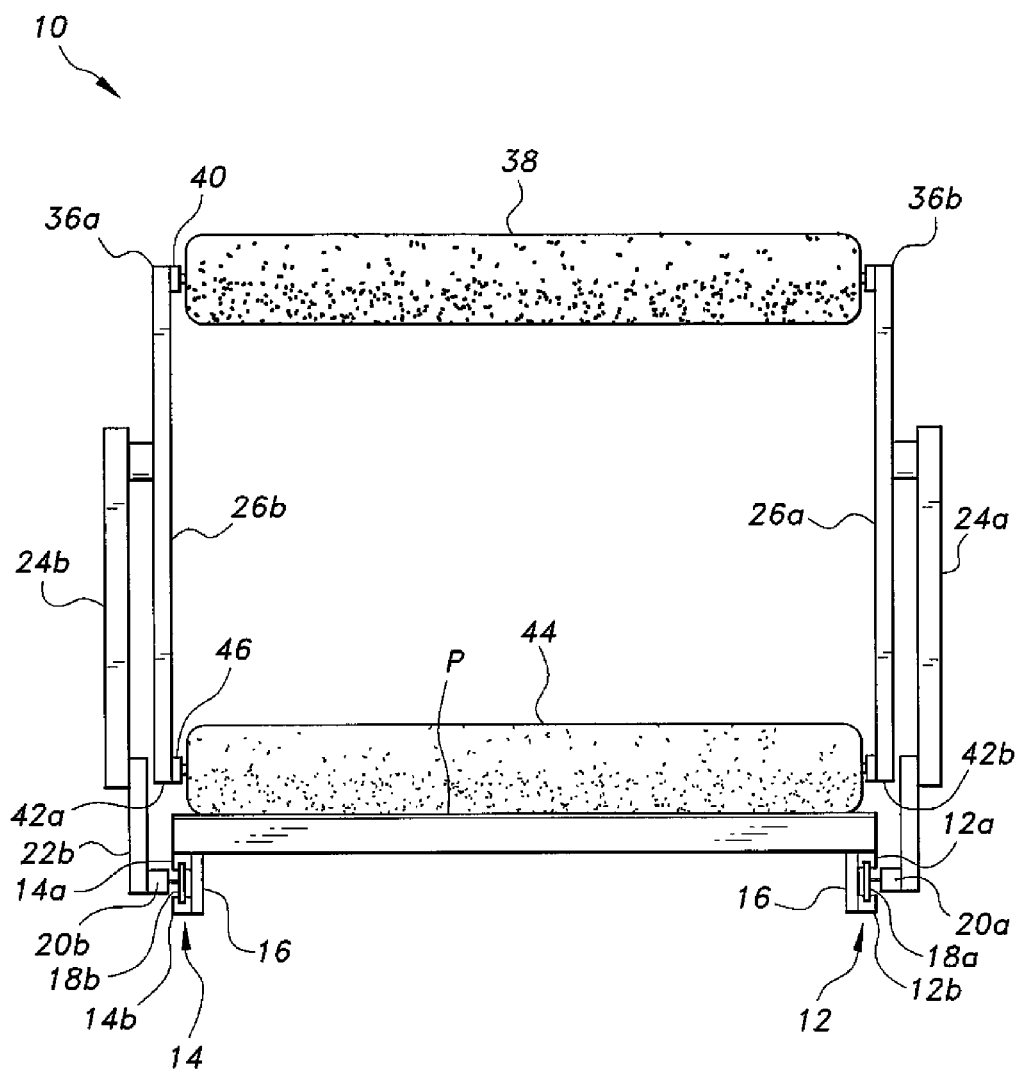
FIG. 4 is an environmental end elevation view of the photovoltaic panel cleaning machine according to the present invention, illustrating further features thereof.

The panel cleaning machine 10 includes a first pair of drive and guide wheels 18a captured between the first track rails 12a and 12b, and a second pair of drive and guide wheels 18b captured between the second track rails 14a and 14b. At least one of the wheels 18a, 18b of each wheel pair is driven by a drive motor 20a, 20b, respectively, for each wheel pair, as shown in FIG. 4. The motors 20a, 20b extend laterally inward from the lower edges of respective drive brackets 22a and 22b, disposed laterally outboard of the tracks 12, 14 and wheels 18a, 18b. A plate support arm 24a and 24b, respectively, extends upward from its respective drive bracket 22a, 22b.

The upper end of each of the plate support arms 24a, 24b has a plate 26a, 26b, respectively, rotationally or pivotally secured thereon and parallel to one another. A drive motor 28, most preferably a stepper motor, extends inboard from the upper end of the first plate support arm 24a to rotate the first plate 26a thereon. As the two plates 26a and 26b are tied together by various panel cleaning elements, as described further below, the second plate 26b rotates in unison with the first plate 26a when the motor 28 is activated.

Each plate 26a, 26b preferably has a triangular configuration, and most preferably an equilateral triangular configuration, and defines three corresponding apices. The first apices of the two plates 26a, 26b are designated as apices 30a and 30b and have a pneumatic blower tube 32 extending therebetween. The tube 32 includes a plurality of holes 34 therein to expel compressed air therefrom to blow dust and debris from the PV panels P when the machine 10 is in operation. The second apices 36a, 36b have a first cleaning element comprising a first roller 38 extending therebetween. The first roller 38 is driven rotationally by a first cleaning element drive motor 40. This first roller 38 is preferably covered by a synthetic foam plastic material, e.g., polyurethane. The third apices 42a, 42b (FIG. 4) have a second cleaning element comprising a second roller 44 extending therebetween. The second roller 44 is driven rotationally by a second cleaning element drive motor 46 (FIG. 4). The second roller 44 is preferably covered by a synthetic wool fiber material to generate dust-attracting static electricity as it rubs against the surface of the PV panels P. The movable components of the above-described machine 10, i.e., wheels, motors, brackets, plates, and cleaning elements, comprise a frame for the machine 10. The frame selectively translates or travels along the length of the linear array of photovoltaic panels P to clean those panels periodically, as required.

Figure 5:
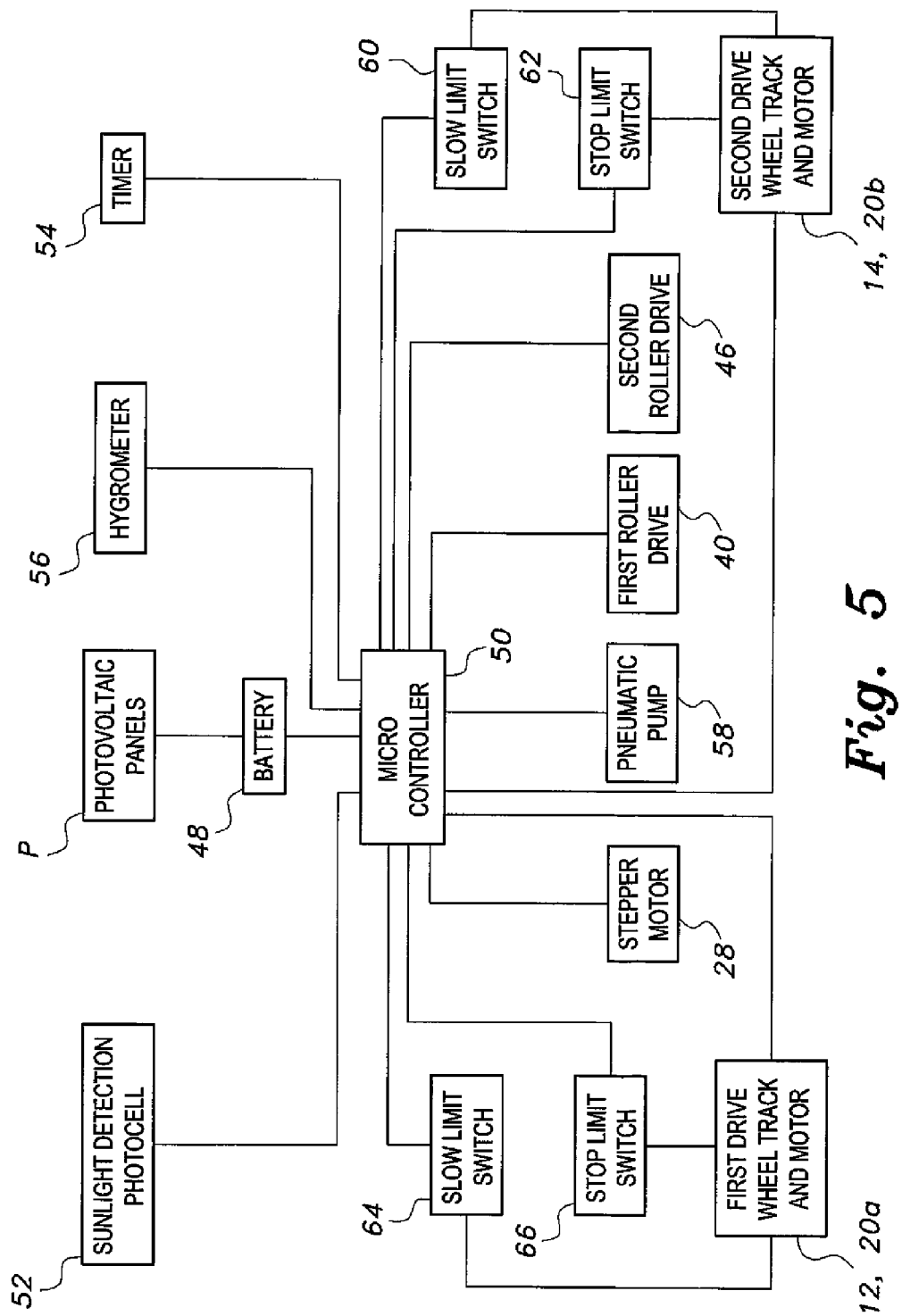
FIG. 5 is a block diagram showing the electrical components of the photovoltaic panel cleaning machine according to the present invention.

The automated operating system for the PV panel cleaning machine 10 is shown by means of a block diagram in FIG. 5 of the drawings. The machine 10 receives electrical power from the PV panel array P. This electrical power may charge an electrical storage battery 48 within the frame or machine 10. Electrical power from the battery 48 is controlled by a microcontroller 50 via conventional relays and circuitry. The microcontroller 50 communicates with various other components to operate the system, as described below.

Initially, the machine 10 is stopped or parked at one end or the other of the two tracks 12 and 14 that extend somewhat beyond the solar panel array P in order to remain clear of the panels. This start position is indicated as step 100 in the flowchart of FIG. 6. A photocell 52 senses when there is adequate sunlight to warrant operation of the solar panels P, i.e., to determine their need for cleanliness. If it is dark, then there is no need to deplete the electrical power from the storage battery 48 to operate the machine 10, since the PV panels P cannot generate any practicable electrical energy in such conditions, whether they be clean or obscured by dust and debris.

Figure 3:
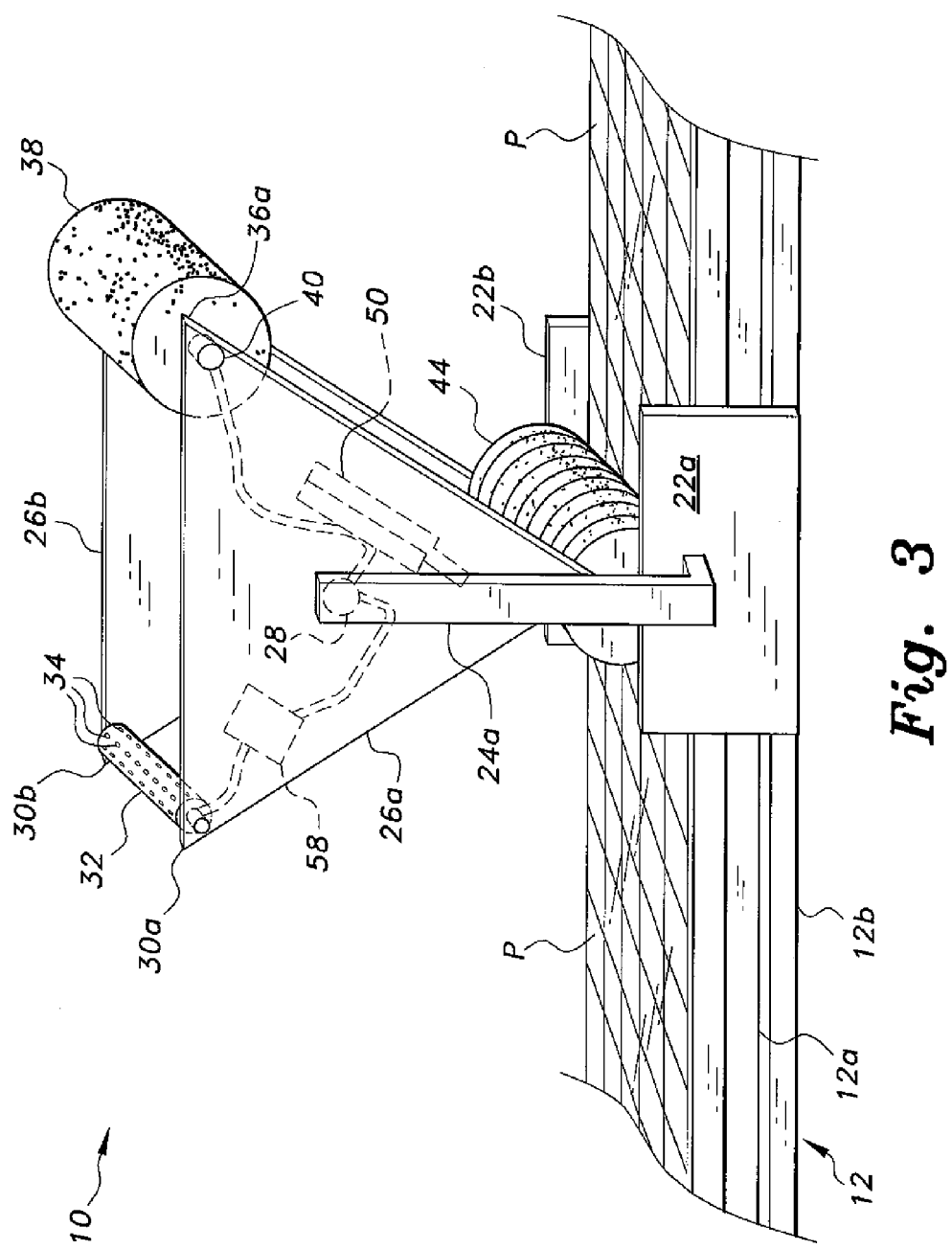
FIG. 3 is a detailed environmental side elevation view of the photovoltaic panel cleaning machine according to the present invention, illustrating further features thereof.
Figure 6:
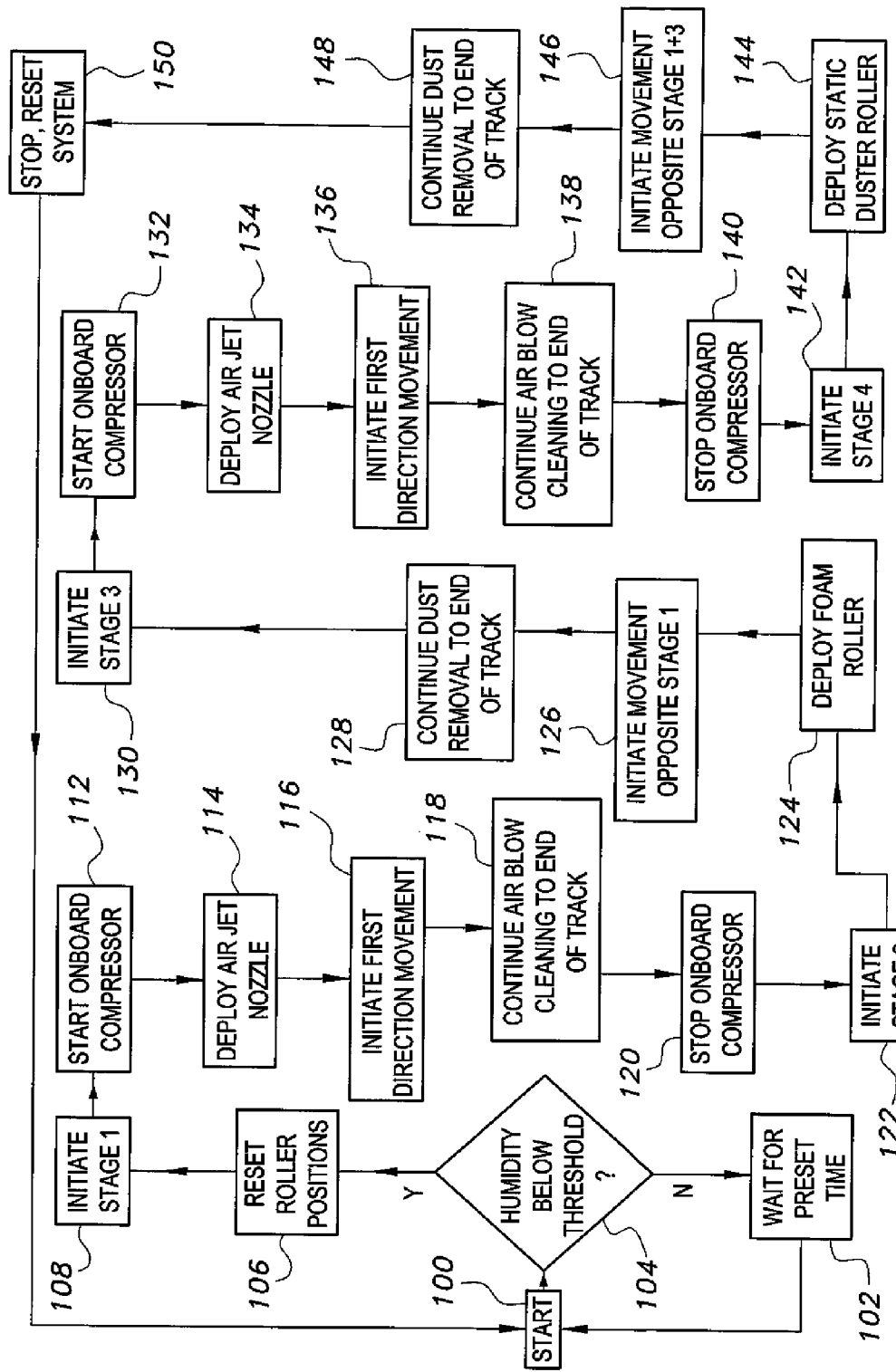
FIG. 6 is a flowchart briefly describing the steps in the operation of the photovoltaic panel cleaning machine according to the present invention.

When the photocell 52 senses sufficient sunlight, a timer 54 (FIG. 5) is actuated to delay the start of the cleaning operation to an optimum time, as indicated by the second step 102 of FIG. 6. A hygrometer 56 detects latent humidity to determine whether conditions are correct for operation of the device, i.e., there is no appreciable moisture disposed upon the solar panels, as indicated by the third step 104 of FIG. 6. Alternatively, the operating system of the machine 10 may be programmed to blow-dry some slight accumulation of moisture on the panels by means of the pneumatic blower tube 32. In any event the plates 26a, 26b are rotated to position the pneumatic tube 32 adjacent the surface of the panels P, as indicated by the fourth step 106 of FIG. 6, either to blow any condensation from the surface of the panels P or to blow dry dust and debris from the panel P surface. This is indicated by the "Initiate Stage 1" step 108 in FIG. 6. This initialization causes the onboard air compressor or pump 58 (FIGS. 1, 3, and 5) to begin operation and the blower tube 32 with its air jet nozzles or holes 34 to be deployed adjacent the panel surface if this has not previously been done, as indicated by the seventh and eighth steps 112 and 114 of FIG. 6. The onboard compressor 58 receives electrical energy from the battery 48 according to programming from the microcontroller 50 for its operation.

The machine 10 is advanced along the length of the elongate solar panel array P by the motorized wheels 18a, 18b traveling in their respective tracks 12 and 14 installed along each edge of the solar panel array P, generally as indicated by the ninth step 116 of FIG. 6. The tracks 12 and 14 communicate electrically with the solar panels P to receive electrical power, which is passed to the drive motors 20a, 20b through their metal wheels 18a, 18b, as is well known in the field of electrically powered rail vehicles. The machine 10 continues to travel the entire length of the panel P array while simultaneously blowing moisture or dust and debris from the surface of the panels P, as indicated by the tenth step 118 of FIG. 6. As the machine 10 approaches the opposite end of the panels P, the machine 10 detects a first proximity switch 60 (FIG. 1) that signals the machine 10 to slow its operation as it approaches the end of the tracks 12 and 14. The machine 10 proceeds at a slower speed until it reaches the second proximity switch 62 (FIG. 1) installed just beyond the end of the panels P, causing the machine 10 to shut down the onboard compressor 58, as indicated by the eleventh step 120 of FIG. 6, and to stop just beyond the PV panels P.

When the panels P have been determined to be dry or the initial dust and debris have been blown off, the machine 10 initiates "stage 2" of the operation (twelfth step 122 of FIG. 6) by rotating the pneumatic blower tube 32 away from the panel P surface, while simultaneously rotating the foam plastic roller 38 into position contacting the surface of the PV panels P, generally as indicated by the thirteenth step 124 of FIG. 6. The foam plastic roller 38 and the fiber roller 44 are larger in diameter than the blower tube 32, so the rollers 38 and 44 actually contact the panel P surface to mechanically remove particulate matter. The wheel drive motors 20a and 20b are reversed to drive the machine 10 back in the opposite direction from its first stage operation, generally as indicated by the fourteenth step 126 of FIG. 6. The roller 38 is rotated by its drive motor 40 so that the roller surface advances in the direction of travel of the machine along the solar panels P, i.e., there is relative motion between the contact surface of the roller 38 and the panels P during operation as the apparatus 10 reverses direction and travels back along the length of the solar panel array P. This removes most, if not all, of the solid particles remaining after the air-blowing operation.

A third proximity switch 64 is located just short of the end of the panels P, generally opposite the first proximity switch 60, as shown in FIG. 1. The operation is substantially the same as described above for the first proximity switch 60, i.e., this third switch signals the machine 10 to slow as it approaches the ends of the tracks 12 and 14. The machine 10 continues to slowly move along the tracks and beyond the end of the panel P until it encounters the fourth proximity switch 66, whereupon the machine 10 stops to ready itself for the third stage of the operation as indicated by the sixteenth step 130 of FIG. 6. The foam plastic roller 38 is then rotated away from the surface of the panels P, and the pneumatic blower tube 32 is simultaneously rotated once again adjacent to the panel P surface and the compressor or air pump 58 is once again started, generally as indicated by the seventeenth and eighteenth steps 132 and 134 of FIG. 6. The direction of travel is reversed once again, as indicated by the nineteenth step 136 of FIG. 6, so that the machine 10 proceeds along the length of the panel P array in its original direction of travel while blowing any remaining material from the panel P surface, in accordance with the twentieth step 138 of FIG. 6. This operation continues until the machine again encounters the first and second proximity switches 60 and 62 to once again slow and stop the machine 10 and shut down the onboard compressor 58, generally as indicated by the twenty-first step 140 of FIG. 6. Thus, the sixteenth through twenty-first steps 130 through 140 are substantially the same as the corresponding seventh through twelfth steps 112 through 120, described further above.

Finally, the machine 10 initiates "stage 4" of the operation by rotating the roller and blower assembly to position the second roller 44 in contact with the surface of the solar panel array P, as indicated by the twenty-second and twenty-third steps 142 and 144 of FIG. 6. This second roller 44 incorporates a synthetic fiber material that generates a static electrical charge as it brushes against the surface of the panels P. As in the case of the first (foam) roller 38, the drive motor 46 rotates the roller 44 so that its contact with the panel P surface is opposite the direction of travel of the machine 10, i.e., there is a difference in velocity between the rotating surface of the roller 44 and the panel P surface. The resulting static charge attracts any remaining dust and/or particulate debris from the panel P surface as the machine 10 reverses its direction once again to return to its original starting position at one end of the panel array, generally as indicated by the twenty-fourth and twenty-fifth steps 146 and 148 of FIG. 6.

When the machine 10 again reaches the third and fourth proximity switches 64 and 66, the microcontroller 50 will proceed to shut down the operation until the machine 10 is needed again. The process repeats beginning with the first (start) step 100 of FIG. 6, and continues once again as described above. The result is a clean PV panel P array capable of optimizing electrical power production.

It is to be understood that the present invention is not limited to the embodiments described above, but encompasses any and all embodiments within the scope of the following claims.

We claim:

1. A photovoltaic panel cleaning machine for cleaning a linear array of photovoltaic panels, the machine comprising:
   a frame movably disposed upon the photovoltaic panels;
   a plurality of panel cleaning elements disposed across the frame, the panel cleaning elements comprising a pneumatic blower, a foam plastic roller, and a synthetic fiber roller; and
   an automated system disposed on the frame, the system selectively driving the frame and the panel cleaning elements along the linear array of photovoltaic panels and selectively positioning each of the panel cleaning elements adjacent the photovoltaic panels, in sequence.

2. The photovoltaic panel cleaning machine according to claim 1, further comprising an air compressor disposed within the frame, the air compressor communicating pneumatically with the pneumatic blower.

3. The photovoltaic panel cleaning machine according to claim 1, further comprising the linear array of photovoltaic panels in combination therewith.

4. The photovoltaic panel cleaning machine according to claim 1, further comprising:
   laterally opposed first and second tracks disposed along the linear array of photovoltaic panels; and
   an electrical power supply disposed on the frame, the electrical power supply selectively communicating electrically with the first and second tracks.

5. The photovoltaic panel cleaning machine according to claim 4, wherein the frame further comprises:
   a first plate;
   a second plate parallel to and laterally spaced from the first plate, each of the plates having a triangular configuration defining three apices, each of the panel cleaning elements extending laterally between corresponding apices of the first plate and the second plate, respectively;
   a first cleaning element drive motor disposed between one of the plates and a first one of the panel cleaning elements; and
   a second cleaning element drive motor disposed between one of the plates and a second one of the panel cleaning elements.

6. The photovoltaic panel cleaning machine according to claim 5, further comprising:
   a first pair of wheels disposed along the first tracks;
   a second pair of wheels disposed along the second tracks;
   a drive bracket extending laterally from each of the pairs of wheels;
   at least one drive motor disposed upon each of the drive brackets, the drive motor driving a corresponding one of the wheels;
   a plate support arm extending from each of the drive brackets, each of the plate support arms having one of the plates pivotally mounted thereon; and a stepper motor disposed between one of the plate support arms and a corresponding one of the plates, the stepper motor selectively rotating the plates.

7. A photovoltaic panel cleaning machine for a linear array of photovoltaic panels, the machine comprising:
 a frame movably disposed upon the photovoltaic panels;
 a plurality of panel cleaning elements disposed across the frame, the panel cleaning elements comprising:
  a pneumatic blower;
  a foam plastic roller; and
  a synthetic fiber roller;
 means for moving the frame across the linear array of photovoltaic panels; and
 means for selectively and alternately positioning one of the cleaning elements to the photovoltaic panels for alternately blowing compressed air across the panel, wiping dust and dirt from the panels, and electrostatically cleaning the panels.

8. The photovoltaic panel cleaning machine according to claim 7, wherein said means for moving the frame and said means for selectively and alternately positioning one of the cleaning elements to the photovoltaic panels further comprise an automated system disposed on the frame, the system selectively driving the frame, the pneumatic blower, the foam plastic roller, and the synthetic fiber roller along the linear array of photovoltaic panels and selectively positioning the pneumatic blower, the foam plastic roller, and the synthetic fiber static roller adjacent the photovoltaic panels, in sequence.

9. The photovoltaic panel cleaning machine according to claim 7, further comprising the linear array of photovoltaic panels in combination therewith.

10. The photovoltaic panel cleaning machine according to claim 7, further comprising an air compressor disposed within the frame, the air compressor communicating pneumatically with the pneumatic blower.

11. The photovoltaic panel cleaning machine according to claim 7, wherein the frame further comprises:
 a first plate;
 a second plate parallel to and laterally spaced from the first plate, each of the plates having a triangular configuration defining three apices, each of the panel cleaning elements extending laterally between corresponding apices of the first plate and the second plate, respectively;
 a first cleaning element drive motor disposed between one of the plates and a first one of the panel cleaning elements; and
 a second cleaning element drive motor disposed between one of the plates and a second one of the panel cleaning elements.

12. The photovoltaic panel cleaning machine according to claim 11, further comprising:
 laterally opposed first and second tracks disposed along the linear array of photovoltaic panels; and
 an electrical power supply disposed on the frame, the electrical power supply selectively communicating electrically with the first and second tracks.

13. The photovoltaic panel cleaning machine according to claim 12, wherein said means for moving the frame further comprises:
 a first pair of wheels disposed along the first tracks;
 a second pair of wheels disposed along the second tracks;
 a drive bracket extending laterally from each of the pairs of wheels;
 at least one drive motor disposed upon each of the drive brackets, the drive motor driving a corresponding one of the wheels;
 a plate support arm extending from each of the drive brackets, each of the plate support arms having one of the plates pivotally mounted thereon; and
 a stepper motor disposed between one of the plate support arms and a corresponding one of the plates, the stepper motor selectively rotating the plates.

14. A plurality of photovoltaic panels and a photovoltaic panel cleaning machine therefor, comprising in combination:
 a linear array of photovoltaic panels;
 a photovoltaic panel cleaning machine movably disposed thereon, the machine including:
  a frame;
  a plurality of panel cleaning elements disposed across the frame, the panel cleaning elements comprising a pneumatic blower, a foam plastic roller, and a synthetic fiber roller;
  means for moving the frame across the linear array of photovoltaic panels; and
  means for selectively and alternately positioning one of the cleaning elements to the photovoltaic panels for alternately blowing compressed air across the panel, wiping dust and dirt from the panels, and electrostatically cleaning the panels.

15. The photovoltaic panels and photovoltaic panel cleaning machine combination according to claim 14, wherein said means for moving the frame and said means for selectively and alternately positioning one of the cleaning elements to the photovoltaic panels further comprise an automated system disposed on the frame, the system selectively driving the frame, the pneumatic blower, the foam plastic roller, and the synthetic fiber roller along the linear array of photovoltaic panels and selectively positioning the pneumatic blower, the foam plastic roller, and the synthetic fiber roller adjacent the photovoltaic panels, in sequence.

16. The photovoltaic panels and photovoltaic panel cleaning machine combination according to claim 15, further comprising an air compressor disposed within the frame, the air compressor communicating pneumatically with the pneumatic blower.

17. The photovoltaic panels and photovoltaic panel cleaning machine combination according to claim 14, wherein the frame further comprises:
 a first plate;
 a second plate parallel to and laterally spaced from the first plate, each of the plates having a triangular configuration defining three apices, each of the panel cleaning elements extending laterally between corresponding apices of the first plate and the second plate, respectively;
 a first cleaning element drive motor disposed between one of the plates and a first one of the panel cleaning elements; and
 a second cleaning element drive motor disposed between one of the plates and a second one of the panel cleaning elements.

18. The photovoltaic panels and photovoltaic panel cleaning machine combination according to claim 14, further comprising:
 laterally opposed first and second tracks disposed along the linear array of photovoltaic panels; and
 an electrical power supply disposed on the frame, the electrical power supply selectively communicating electrically with the first and second tracks, said means for moving the frame including:
 a first pair of wheels disposed along the first tracks;
 a second pair of wheels disposed along the second tracks;
 a drive bracket extending laterally from each of the pairs of wheels;

at least one drive motor disposed upon each of the drive brackets, the drive motor driving a corresponding one of the wheels;

a plate support arm extending from each of the drive brackets, each of the plate support arms having one of the plates pivotally mounted thereon; and a stepper motor disposed between one of the plate support arms and a corresponding one of the plates, the stepper motor selectively rotating the plates.

\* \* \* \* \*